May 27, 1930.  W. A. ENDTER  1,760,485
AIRPLANE CONSTRUCTION
Filed May 4, 1929
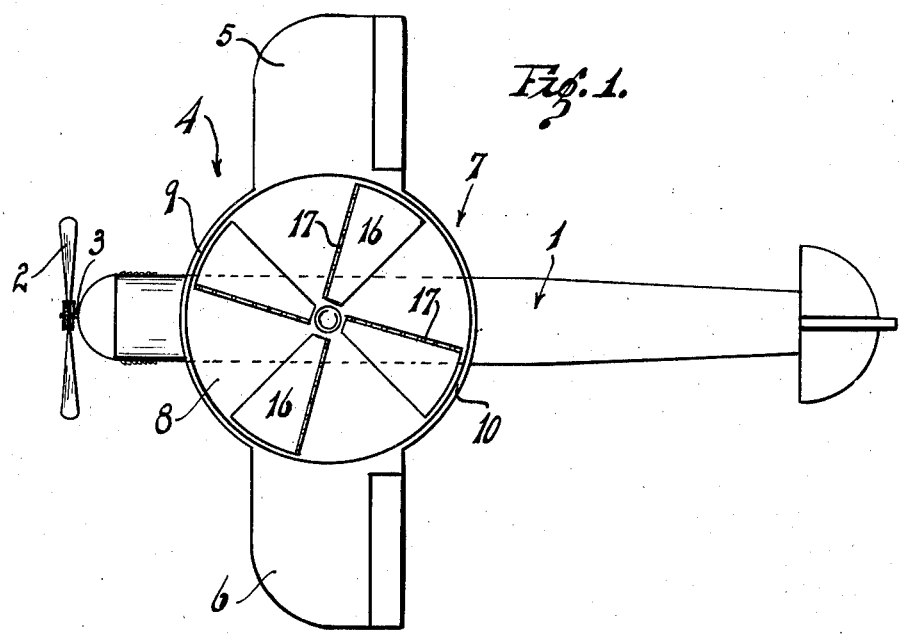
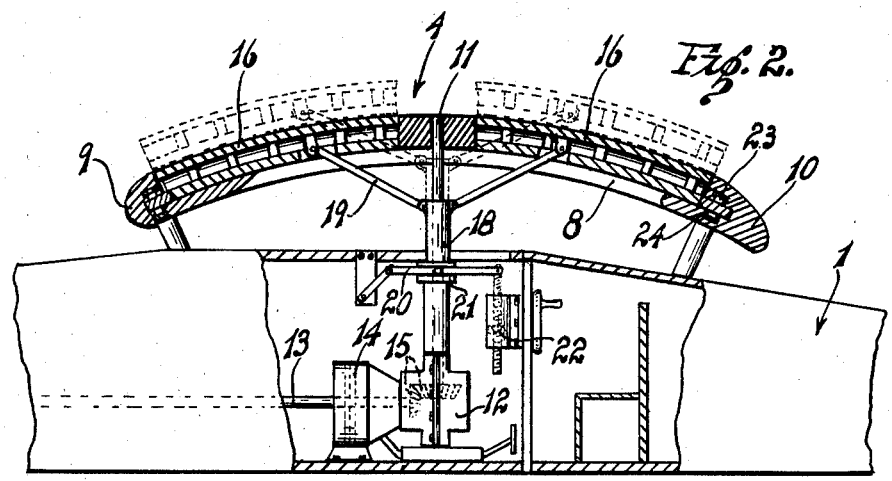
INVENTOR.
WALDEMAR A. ENDTER.
BY
ATTORNEY.

Patented May 27, 1930

1,760,485

UNITED STATES PATENT OFFICE

WALDEMAR A. ENDTER, OF LONG BEACH, CALIFORNIA

AIRPLANE CONSTRUCTION

Application filed May 4, 1929. Serial No. 360,460.

This invention relates to an airplane wing construction in which both the helicopter and tractor propellers are employed to provide an airplane which can rise from the ground in a very short distance and which can also land in a comparatively short distance.

An object of my invention is to provide an airplane in which the helicoptic propeller is a portion of the usual wing of the plane and which also acts as a lifting surface when it is stationary, and during the time that the tractor propeller is propelling the plane.

Still another object is to provide an airplane construction of the character stated in which vanes on the helicopter propeller can be manually adjusted to provide a high lift for purposes of ascent or descent, these vanes being closable when the propeller is to be used as a wing surface.

Other objects, advantages, and features of invention may appear from the accompanying drawing, the subjoined detailed description, and the appended claims.

In the drawing

Figure 1 is a plan view of an airplane embodying my construction.

Figure 2 is a fragmentary transverse sectional view of the wing construction, parts of the fuselage being broken away to show interior construction.

The numeral 1 indicates the fuselage of the airplane which may be of any well-known construction now in general use. A tractor type of propeller 2 is mounted at the front end of the fuselage and this propeller is driven from a suitable motor or motors (not shown) through the shaft 3. A wing 4 is positioned above the fuselage 1 and extends transversely thereof, as is usual in airplane construction.

The wing 4 consists of outer tip sections 5, 6 and a central enlarged area 7 in which the helicopter propeller 8 is mounted. The propeller 8 is preferably circular in form and is mounted flush with the wing 4, conforming in curvature with the wing. When this helicopter propeller is stationary it will have the same effect as any other portion of the wing.

Extending between the tip sections 5, 6 and encircling the propeller 8 I provide a stationary leading edge 9 and at the rear of the wing I provide a stationary trailing edge 10. The purpose of the edges 9, 10 is to provide a wing section as nearly conforming with present standards as possible. The propeller 8 is mounted upon a shaft 11, the shaft 11 extending downwardly into the fuselage and into a gear box 12, and a drive shaft 13 extends through a clutch 14 into the gear box 12. Suitable gears 15 in the box transmit power from the shaft 13 to the shaft 11, thus rotating the propeller 8 at the will of the operator.

In order that the propeller 8 may create a strong vertical lift I provide a plurality of adjustable shutters 16 which are hinged along one edge, as at 17, and these shutters are adjusted to open or closed position by the following manually controlled means. A sleeve 18 surrounds the shaft 11 and arms 19 are pivoted to the upper end of the sleeve and to the shutters 16. An arm 20 is pivotally secured to a thrust ring 21 on the sleeve 18 and a manually controlled jack 22 is connected to the arm 20 thereby raising and lowering the arm whereby the sleeve 18 is raised or lowered, thus opening or closing the shutters 16.

When the plane is taking off or landing the shutters 16 are opened but as soon as the plane has reached a reasonable altitude the shutters are closed and the entire power of the motor is diverted to the propeller 2.

If it is found desirable I may provide antifriction bearings 23, 24 above and below the edges of the propeller 8 and these anti-friction bearings are positioned in the wing 4 and also in the edges 9, 10. These bearings would tend to prevent distortion of the propeller and would tend to hold it in proper position.

Having described my invention, I claim:

1. In an airplane, a transverse wing, a helicopter propeller in said wing, means to rotate said propeller, a stationary leading edge extending partly around said propeller, a stationary trailing edge extending partly around said propeller, the upper surface of said propeller conforming in curvature to the curvature of the wing.

2. In an airplane, a transverse wing comprising an enlarged central section, tips extending from either side of said central section, a circular helicopter propeller in said central section, the upper surface of said propeller conforming in shape to the curvature of the wing, and anti-friction bearings between said wing and propeller, and means to rotate said propeller.

In testimony whereof, I affix my signature.

WALDEMAR A. ENDTER.